United States Patent
Wang et al.

(10) Patent No.: US 10,558,289 B2
(45) Date of Patent: Feb. 11, 2020

(54) CONTROL METHOD AND ELECTRONIC DEVICE

(71) Applicant: Lenovo (Beijing) Limited, Beijing (CN)

(72) Inventors: Dongyang Wang, Beijing (CN); Guangbin Li, Beijing (CN); Bing Xie, Beijing (CN); Xuhui Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/376,973

(22) Filed: Dec. 13, 2016

(65) Prior Publication Data

US 2017/0168643 A1 Jun. 15, 2017

(30) Foreign Application Priority Data

Dec. 14, 2015 (CN) .......................... 2015 1 0923768

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04102* (2013.01)

(58) Field of Classification Search
CPC ...... G06F 3/0416; G06F 3/0412; G06F 3/044; G06F 2203/04102
See application file for complete search history.

(56) References Cited

U.S. PATENT DOCUMENTS

| | | | | |
|---|---|---|---|---|
| 7,298,365 B2 * | 11/2007 | Moriyama | ............ | G06F 3/0483 345/158 |
| 7,456,823 B2 * | 11/2008 | Poupyrev | ................ | G06F 3/011 178/18.06 |
| 8,654,087 B2 * | 2/2014 | Kang | .................... | G06F 1/1626 345/173 |
| 8,654,095 B1 * | 2/2014 | Cho | ...................... | G06F 3/0412 345/173 |
| 8,666,455 B2 * | 3/2014 | Song | ................... | H04M 1/0268 455/566 |

(Continued)

FOREIGN PATENT DOCUMENTS

| CN | 103218096 A | 7/2013 |
|---|---|---|
| CN | 103383951 A | 11/2013 |

(Continued)

*Primary Examiner* — Grant Sitta
(74) *Attorney, Agent, or Firm* — Kunzler Bean & Adamson

(57) ABSTRACT

For controlling flexible display electronic devices, a control method and electronic device are disclosed. The control method includes receiving signals from touch electrodes of a flexible display touch screen for an electronic device, calculating a bending parameter of the flexible display touch screen, and controlling an operation of the electronic device. The electronic device includes a flexible display touch screen, wherein the flexible display touch screen includes touch electrodes and a touch detection circuit. The electronic device includes a driving chip that controls the electronic device. The electronic device includes a processor that calculates a bending parameter of the flexible display touch screen.

20 Claims, 2 Drawing Sheets

(56) References Cited

U.S. PATENT DOCUMENTS

| | | | |
|---|---|---|---|
| 8,963,833 B2* | 2/2015 | Yu | G06F 3/041 178/18.01 |
| 9,053,651 B2* | 6/2015 | Yeo | G09G 5/00 |
| 9,110,516 B2* | 8/2015 | Hwang | G06F 3/03 |
| 9,310,925 B2* | 4/2016 | Fujii | G06F 3/0416 |
| 9,459,656 B2* | 10/2016 | Shai | G06F 1/1615 |
| 10,416,723 B2* | 9/2019 | Song | G06F 1/1652 |
| 2003/0227441 A1* | 12/2003 | Hioki | G06F 3/0412 345/156 |
| 2004/0008191 A1* | 1/2004 | Poupyrev | G06F 3/011 345/184 |
| 2009/0174679 A1* | 7/2009 | Westerman | G06F 3/03547 345/173 |
| 2010/0117975 A1* | 5/2010 | Cho | G06F 1/1626 345/173 |
| 2010/0182265 A1* | 7/2010 | Kim | G06F 1/1616 345/173 |
| 2011/0241998 A1* | 10/2011 | McKinney | G06F 1/1616 345/168 |
| 2012/0062488 A1* | 3/2012 | Lin | G06F 3/0418 345/173 |
| 2013/0127918 A1* | 5/2013 | Kang | G06F 3/0481 345/660 |
| 2013/0145311 A1* | 6/2013 | Joo | G06F 3/04886 715/788 |
| 2013/0162546 A1* | 6/2013 | Yeh | G06F 3/0221 345/173 |
| 2013/0162556 A1* | 6/2013 | Yu | G06F 3/041 345/173 |
| 2013/0215088 A1* | 8/2013 | Son | G09G 5/40 345/204 |
| 2014/0004906 A1* | 1/2014 | Chi | H04B 1/38 455/566 |
| 2014/0028596 A1* | 1/2014 | Seo | G06F 3/0487 345/173 |
| 2014/0028597 A1* | 1/2014 | Cho | G06F 3/0487 345/173 |
| 2014/0035869 A1* | 2/2014 | Yun | G06F 3/0414 345/174 |
| 2014/0049464 A1* | 2/2014 | Kwak | G06F 3/0487 345/156 |
| 2014/0055394 A1* | 2/2014 | Park | H01L 41/0825 345/173 |
| 2014/0078047 A1* | 3/2014 | Seo | G06F 3/0487 345/156 |
| 2014/0101560 A1* | 4/2014 | Kwak | G06F 1/1652 715/738 |
| 2014/0362023 A1* | 12/2014 | Fujii | G06F 1/1652 345/174 |
| 2015/0042674 A1* | 2/2015 | Lin | G09G 5/14 345/619 |
| 2015/0116608 A1* | 4/2015 | Jeong | G06F 1/1652 349/12 |
| 2015/0153778 A1* | 6/2015 | Jung | G06F 1/1677 345/156 |
| 2015/0220118 A1* | 8/2015 | Kwak | G06F 1/1652 345/667 |
| 2015/0316961 A1* | 11/2015 | Zhang | G06F 1/1652 345/156 |
| 2015/0378557 A1* | 12/2015 | Jeong | G06F 3/0488 715/835 |
| 2017/0003793 A1* | 1/2017 | Gao | G06F 3/0416 |
| 2017/0160770 A1* | 6/2017 | Shen | G06F 1/1652 |

FOREIGN PATENT DOCUMENTS

| | | |
|---|---|---|
| CN | 103576979 A | 2/2014 |
| CN | 103870040 A | 6/2014 |
| CN | 103870087 A | 6/2014 |

* cited by examiner

CONTROL METHOD AND ELECTRONIC DEVICE

FIELD

The subject matter disclosed herein relates to the technical field of flexible display electronic devices, and in particular to a control method and an electronic device.

BACKGROUND

Electronic devices with a touch display function are widely used in people's daily lives and work, and increasingly utilize flexible display touch screen displays. Hence, adapting flexible display touch screens to better implement the touch display function of the electronic devices in concert with the flexibility of the devices is an important development trend of such electronic devices.

Currently, to detect the bending state of the flexible display touch screen, position sensor units need to be incorporated separately in electronic devices. As a result, detection of the bending state is complex, and the manufacturing cost of the electronic devices is increased.

SUMMARY

One embodiment of the present disclosure includes a method. The method includes receiving a plurality of signals from touch electrodes of a flexible display touch screen for an electronic device. The method includes calculating a bending parameter of the flexible display touch screen based upon the plurality of signals. The method includes controlling an operation of the electronic device in response to receiving the plurality of signals.

One embodiment of the present disclosure includes an electronic device. The electronic device includes a flexible display touch screen, which comprises a layer of touch electrodes and a touch detection circuit coupled with the touch electrodes, the touch detection circuit detecting signals from the touch electrodes. The electronic device includes a driving chip coupled with the touch detection circuit configured to control the electronic device in response to the signals from the touch electrodes detected by the touch detection circuit. The electronic device includes a processor that calculates a bending parameter of the flexible display touch screen in response to the touch detection circuit detecting signals from the touch electrodes.

Some preferred but optional features or steps of the subject matter presently disclosed have been defined in the dependent claims.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

The embodiments of the present disclosure provide a control method and an electronic device. It is obvious that the embodiments described herein are not all, but rather only some of the possible embodiments. All other embodiments obtained by those skilled in the art without creative work based on the embodiments disclosed herein shall fall within the scope of the present disclosure.

As described in the background, position sensor units need to be separately arranged in conventional electronic devices with the flexible display touch screen to detect the bending state of the flexible display touch screen. As a result, detection of the bending state becomes complex, and the manufacturing cost of the electronic devices is increased.

In order to solve the above-mentioned problem, some embodiments of the present application comprise a control method, used in an electronic device with a flexible display touch screen.

Figure 1:
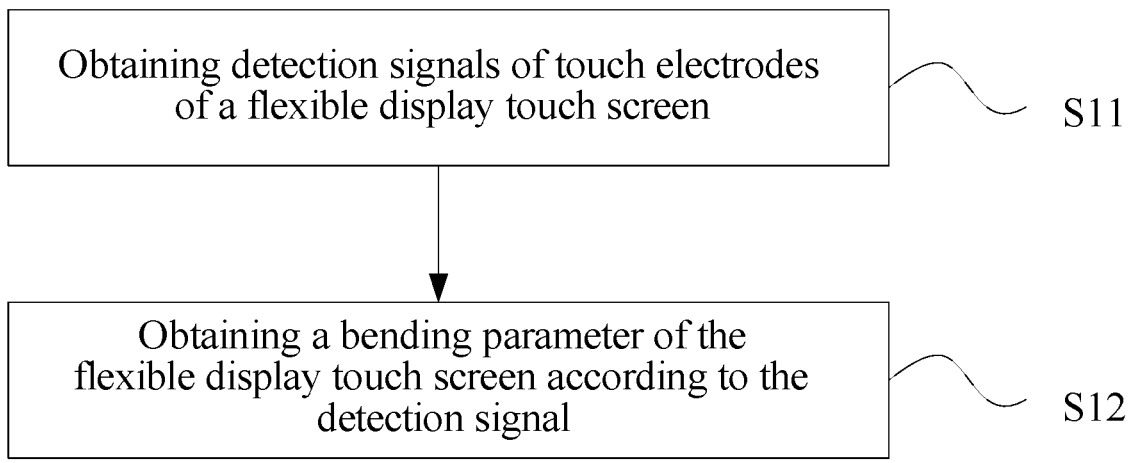
FIG. 1 is a schematic flow diagram of one embodiment of a control method.

FIG. 1 depicts a schematic flow diagram of one embodiment of a control method. The control method comprises step S11 obtaining detection signals of touch electrodes of the flexible display touch screen. The touch electrodes are used for detecting a user's touch operations. The touch electrodes for detecting touch operations are arranged in the flexible display touch screen, and the electronic device determines touched positions according to the detection signals of the touch electrodes, and then responds to the touch operations.

The embodiment depicted in FIG. 1 also comprises step S12: obtaining a bending parameter of the flexible display touch screen according to the detection signal. In the conventional operation mode, the detection signals are only used for detecting touched positions, and responding to touch operations. In other modes, the bending parameter of the flexible display touch screen can be obtained through the detection signals.

Since the control method of the present application can obtain the bending parameter of the flexible display touch screen through the detection signals of the touch electrodes of the flexible display touch screen, the control method can detect the bending state of the flexible display touch screen through the existing parts of the electronic device without needing to incorporate an additional position sensor unit. Consequently, the detection method is simpler, and the manufacturing cost is reduced.

Optionally, in some embodiments step S12 includes: obtaining the bending parameter of the flexible display touch screen according to changes of inductive capacitances corresponding to the detection signals.

Generally speaking, touched position detection comprises obtaining the changes in the inductive capacitances of the corresponding touch electrodes according to the detection signals to determine touched positions and respond to touch operations. When the flexible display touch screen is bent, the detection signals of the touch electrodes corresponding to the bending part will change, and the inductive capacitances of the corresponding touch electrodes will change. However, the changes in the inductive capacitances caused by bending are different from the changes in the inductive capacitances caused by touch. According to this principle, the bending part and range of the flexible display touch screen can be determined by utilizing the changes in the inductive capacitances corresponding to the detection signals without requiring the separate arrangement of the position sensor.

Figure 2:
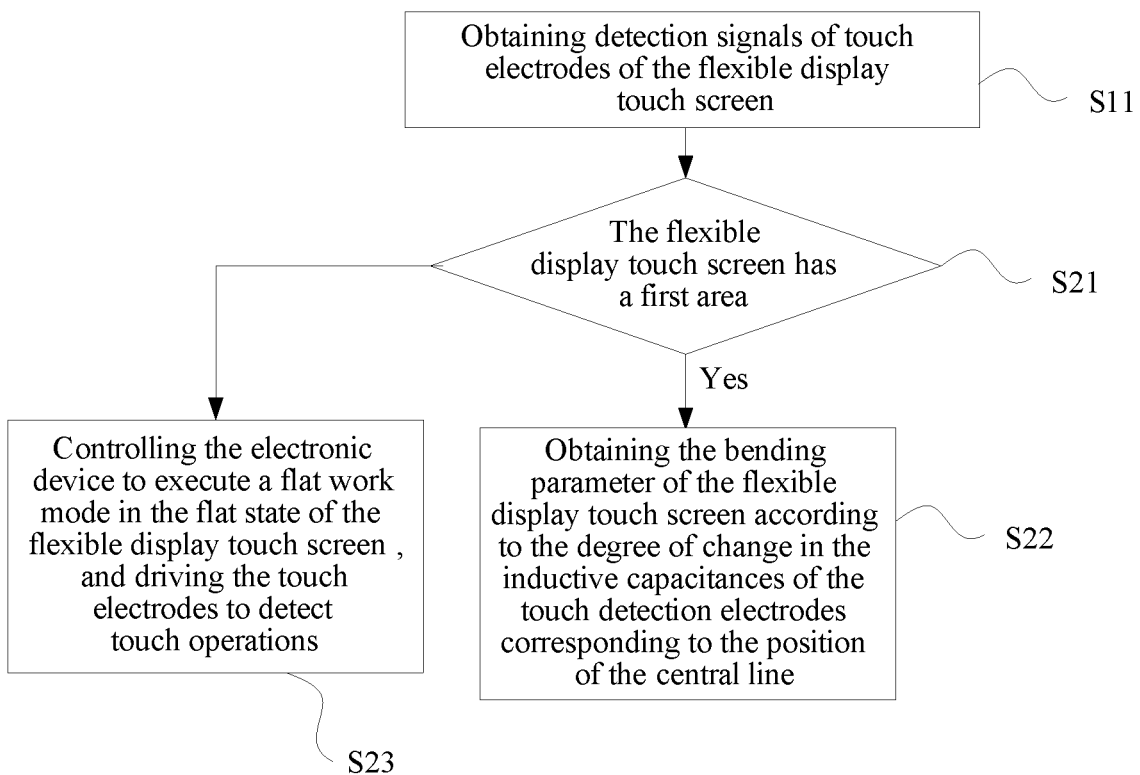
FIG. 2 is a schematic flow diagram of one embodiment of a method for obtaining the bending parameter of the flexible display touch screen according to the changes in the inductive capacitances corresponding to the detection.

FIG. 2 is a schematic flow diagram of one embodiment of the method for obtaining the bending parameter of the flexible display touch screen according to the changes in the inductive capacitances corresponding to the detection signals provided in one embodiment of the present application, wherein the method comprises step S21 and step S22.

Step S21 comprises judging whether the flexible display touch screen has a first area. The first area can be determined according to the changes in the inductive capacitances corresponding to the touch electrodes in the flexible display touch screen.

Figure 3:
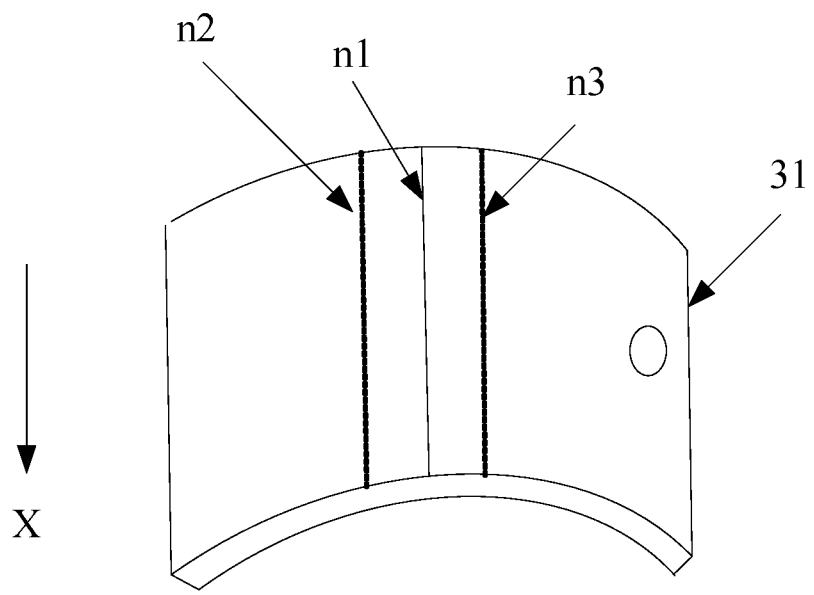
FIG. 3 is a schematic diagram of one embodiment of a method for determining a first area.

FIG. 3 depicts a schematic diagram of one embodiment of the method for determining the first area provided in the embodiment of the present application. In one embodiment, the first area is an area between a dotted line n2 and a dotted line n3 shown in FIG. 3. The first area spans across the flexible display touch screen 31 in a first direction X. At a central line n1, oriented parallel to the first direction X, the degree of change in the inductive capacitances of the touch detection electrodes in the first area is at its greatest. The farther a position is from the central line of the first area, the smaller a degree of change is in the inductive capacitances corresponding to that position. The degree of change in the inductive capacitances of all the touch detection electrodes corresponding to the central line n1 are equal.

In some embodiments, the control method also includes step S22, which is implemented if the flexible display touch screen does have a first area. Step S22 comprises obtaining the bending parameter of the flexible display touch screen according to the degree of change in the inductive capacitances of the touch detection electrodes corresponding to the position of the central line.

As described above, whether the first area exists can be determined by detecting the degree of change in the inductive capacitances. The changes in the inductive capacitances of the touch electrodes caused by touch operations are intermittent, while the changes in the inductive capacitances caused by bending are steady and correspond to a continuous area of touch electrodes running through the flexible display touch screen.

The bending part of the flexible display touch screen can be determined according to the changes in the inductive capacitances of the area corresponding to the central line. The magnitude of the degree of change in the inductive capacitances is in direct proportion to the degree of bending, because the greater the degree of bending is, the greater the degree of change in the inductive capacitances. Therefore, the degree of bending of the flexible display touch screen can be determined according to the degree of change in the inductive capacitances at the central line.

As shown in FIG. 2, some embodiments of the control method also include step S23, which is implemented if the flexible display touch screen does not have a first area. Step S23 comprises controlling the electronic device to execute a flat work mode in the flat state of the flexible display touch screen, and driving the touch electrodes to detect touch operations.

The flat operation mode uses conventional touch detection principles and directly drives the touch electrodes to detect touch operations.

Optionally, when the flexible display touch screen has the first area, the control method also includes: controlling the electronic device to execute a dynamically-bending work mode when the flexible display touch screen is in a dynamically-bending state according to the degree of change in the inductive capacitances of the touch detection electrodes corresponding to the position of the central line. The control method may also include executing a statically-bending work mode when the flexible display touch screen is in the statically-bending state.

Whether the flexible display touch screen is in a dynamically-bending state can be determined according to the degree of change in the inductive capacitances of the touch detection electrodes corresponding to the position of the central line. That is, if the degree of bending of the flexible display touch screen as measured by the change in inductive capacitances is still changing, the flexible display touch screen is in the dynamically-bending state.

Whether the flexible display touch screen is in the statically bending state can also be determined according to the degree of change in the inductive capacitances of the touch detection electrodes corresponding to the position of the central line. In other words, if the the flexible display touch screen is in the bending state, and the amount of curvature of the flexible display touch screen is no longer changing, the flexible display touch screen is in the statically bending state.

If the degree of change in the inductive capacitances of the touch detection electrodes corresponding to the position of the central line does not change again within a set period of time, then it can be determined that the flexible display touch screen is in the statically-bending state. If the degree of change in the inductive capacitances of the touch detection electrodes corresponding to the central line changes within a set period of time, it can be determined that the flexible display touch screen is in the dynamically-bending state.

If the flexible display touch screen has the first area, and if the flexible display touch screen is in the dynamically-bending work mode, the bending parameter of the flexible display touch screen is obtained through the detection signals of the touch electrodes corresponding to the first area, and the touch operations are recognized through the detection signals of the touch electrodes in the other areas of the flexible display touch screen. In other words, the touch electrodes of the first area are used for detecting the bending parameter, while the touch electrodes of the non-first areas can be used for normal touch detection.

If the flexible display touch screen has the first area, and if the flexible display touch screen is in the statically-bending work mode, touch operations can be detected through all the touch electrodes of the flexible display touch screen, including those corresponding to the first area. In this case, the touch detection threshold of the touch electrodes corresponding to the first area is different from that of the touch electrodes in the other areas of the flexible display touch screen. At this point, if the first area is not touched, the bending parameter can be determined according to the degree of change in the inductive capacitances corresponding to the touch electrodes in the first area and the inductive capacitances of those same touch electrodes when the flexible display touch screen is in the flat state.

When there are touch operations, both the touch electrodes of the first area and the touch electrodes in the non-first areas can sense the touch operations. The bending of the first area leads to a change in the reference value of the inductive capacitances corresponding to the touch electrodes, so the touch detection threshold of the touch electrodes corresponding to the first area is different from that of the touch electrodes in the other areas of the flexible display touch screen.

In one embodiment of the subject matter disclosed herein, the bending parameter includes whether the flexible display touch screen is in the bending state and the degree of bending of the flexible display touch screen.

As shown in the above-mentioned description, the control method described in the embodiment of the present application can obtain the bending parameter of the flexible display touch screen according to the detection signals of the touch electrodes of the flexible display touch screen without needing to add an additional position sensor unit; consequently, the detection method is simpler, and the manufacturing cost is reduced.

Other embodiments of the present application include an electronic device, capable of implementing the control method. In some embodiments the electronic device comprises: a flexible display touch screen, which comprises a touch electrode layer and a touch detection circuit connected to the touch electrodes, wherein the touch detection circuit is used for obtaining detection signals of the touch electrodes; a driving chip connected to the touch detection circuit, used for performing a touch operation on the electronic device according to the detection signals and detecting a user's touch operations through the touch electrodes; and a processor, used for acquiring a bending parameter of the flexible display touch screen according to the detection signals.

In some embodiments, the processor is used for obtaining the bending parameter of the flexible display touch screen according to changes of inductive capacitances corresponding to the detection signals. The bending parameter can include whether the flexible display touch screen is in the bending state and the degree of bending of the flexible display touch screen.

In some embodiments including the electronic device, a method for obtaining the bending parameter of the flexible display touch screen through the processor is included. This method comprises: judging whether the flexible display touch screen has a first area, wherein the first area spans across the flexible display touch screen in a first direction and the degree of change in the inductive capacitances of the touch detection electrodes corresponding to a central line parallel to the first direction in the first area is at its greatest, and the farther a position is from the central line of the first area, the smaller a degree of change is in the inductive capacitances corresponding to this position; if the flexible display touch screen has a first area, obtaining the bending parameter of the flexible display touch screen according to the degree of change in the inductive capacitances of the touch detection electrodes corresponding to the position of the central line; and if the flexible display touch screen does not have the first area, the processor is also used for controlling the electronic device to execute a flat work mode in the flat state of the flexible display touch screen and for driving the touch electrodes to detect touch operations.

If the flexible display touch screen has the first area, the control method also includes: controlling the electronic device to execute a dynamically-bending work mode in the dynamically-bending state of the flexible display touch screen according to the degree of change in the inductive capacitances of the touch detection electrodes corresponding to the position of the central line, or to execute a statically-bending work mode in the statically-bending state of the flexible display touch screen.

If the flexible display touch screen has the first area, and if the flexible display touch screen is in the dynamically-bending work mode, the processor is further used for obtaining the bending parameter of the flexible display touch screen through the detection signals of the touch electrodes corresponding to the first area, and detecting touch operations through the detection signals of the touch electrodes in the other areas of the flexible display touch screen.

If the flexible display touch screen has the first area, and if the flexible display touch screen is in the statically-bending work mode, the processor is further used for detecting touch operations through all the touch electrodes of the flexible display touch screen, wherein the touch detection sensitivity of the touch electrodes corresponding to the first area is different from that of the touch electrodes of the other areas of the flexible display touch screen.

In the electronic device included in some embodiments of the subject matter presently disclosed, the processor may be any module having data processing capability. Optionally, in some embodiments the processor is a controller of the electronic device. In such a case, the touch electrodes output detection signals to the touch detection circuit; the touch detection circuit sends the detection signals to the driving chip; the driving chip outputs the degree of change in capacitance of the flexible display touch screen and the corresponding position coordinates to the processor according to the detection signals; and accordingly, the processor outputs the touch screen bending parameter. The processor can also be a driving chip with data processing capability, wherein the driving chip outputs the touch screen bending parameter according to the value of capacitance changes and coordinates.

Figure 4:
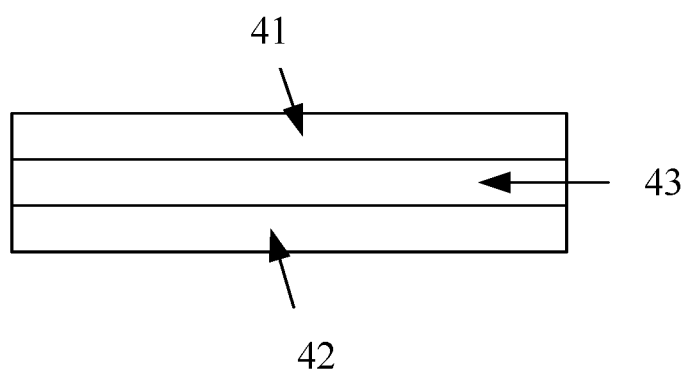
FIG. 4 is a structure diagram of one embodiment of a flexible display touch screen.

FIG. 4 is a structure diagram of one embodiment of a flexible display touch screen, wherein the flexible display touch screen comprises a first flexible substrate 41 and a second flexible substrate 42 arranged opposite to each other. The touch electrodes are the first electrodes arranged on the surface of the first flexible substrate 41 and the second electrodes arranged on the surface of the second flexible substrate. The flexible display touch screen also comprises a display dielectric layer 43 arranged between the first flexible substrate 41 and the second flexible substrate 42.

The inductive capacitors exist between the first electrodes and the second electrodes, and touch detection and bending parameter sensing can be carried out by detecting the inductive capacitances. When a touch operation or bending occurs, the inductive capacitances change, and the touch operation is sensed or the bending parameter is measured by detecting the changes in the inductive capacitances.

In order to ensure the service life of the first electrodes and the second electrodes, the first electrodes and the second electrodes are located internally. Specifically, the first electrodes are arranged on one surface of the first flexible substrate 41 facing the second flexible substrate 42, and the second electrodes are arranged on one surface of the second flexible substrate 42 facing the first flexible substrate 41.

In some embodiments, the first electrodes and the second electrodes comprise transparent electrodes. For example, in one embodiment, both the first electrodes and the second electrodes can be indium tin oxide ("ITO") layers with set electrode patterns. During touch detection and bending parameter detection, the touch detection and bending parameter detection can only be carried out by detecting the capacitance changes in the two ITO layers.

Figure 5:
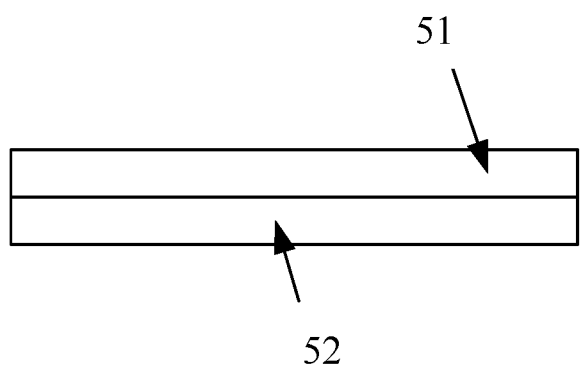
FIG. 5 is a structure diagram of one embodiment of another flexible display touch screen.

FIG. 5 is a structure diagram of another embodiment of a flexible display touch screen, wherein the flexible display touch screen comprises a flexible display substrate 51 and a flexible display module 52 arranged opposite to each other. The flexible display module 52 may be an LCD module or other display module. The touch electrodes are arranged on the surface of the flexible display substrate 51.

In some embodiments, the touch electrodes comprise a single layer of transparent electrodes, such as ITO electrodes. The touch electrodes are arranged on one surface of the flexible display substrate 51 facing the flexible display module 52. As a result of this arrangement, the touch electrodes are not abraded and the service life of the touch electrodes is ensured.

In one embodiment corresponding with FIG. 5, the inductive capacitances exist between the touch electrodes and the flexible display module 52. When bending occurs, the inductive capacitances change, and the bending parameter is measured by detecting the changes in the inductive capacitances.

It should be explained that the composition of the touch electrodes described in some embodiments of the presently disclosed subject matter is not limited to an ITO layer. They can be any transparent, conductive, and bendable material, such as carbon nanotube films, graphene films, metal meshes, nanowire-based transparent conductors, or conducting polymers, among others.

Furthermore, in other embodiments, the touch electrodes can be single-layered structures, and the touch detection and display driving can be carried out simultaneously through a common electrode layer arranged on the surface of an array substrate.

Because the electronic device described in the embodiment of the present application can detect the bending parameter of the flexible display touch screen without requiring an additional position sensor, the method is simple and efficient. No hardware is added to the electronic device, thereby the manufacturing cost is not increased.

Those skilled in the art should be able to implement or use the embodiments after reading the description of the embodiments disclosed above. Various modifications to the embodiments should be apparent to those skilled in the art, and the general principles defined herein may be implemented in other embodiments without departing from the spirit or scope of the embodiments. Thus, the possible embodiments are not intended to be limited to these specific embodiments described herein, but rather are to be accorded with the broadest scope consistent with the principles and novel features disclosed herein.

What is claimed is:

1. A method comprising:
    receiving a plurality of signals from touch electrodes of a flexible display touch screen for an electronic device;
    calculating a bending parameter of the flexible display touch screen based upon the plurality of signals, wherein the bending parameter is associated with a bending state, wherein the bending state is one of a flat work mode, a statically-bending work mode, and a dynamically-bending work mode wherein changes in the amount of bending in a first area of the flexible display touch screen within a set period of time exceed a set threshold;
    determining whether the flexible display touch screen has the first area based on changes in inductive capacitances corresponding to the touch electrodes; and
    controlling an operation of the electronic device in response to receiving the plurality of signals, wherein, in response to determining that the flexible display touch screen is in the dynamically-bending working mode based on changes in the amount of bending of the first area of the flexible display touch screen within the set period of time satisfying the set threshold,
        the touch electrodes in the first area are used for obtaining the bending parameter, and
        the touch electrodes in one or more non-first areas are used for recognizing touch operations.

2. The method of claim 1, wherein calculating a bending parameter of the flexible display touch screen based upon the plurality of signals comprises analyzing changes of inductive capacitances corresponding to the plurality of signals.

3. The method of claim 2, wherein analyzing changes of inductive capacitances corresponding to the plurality of signals comprises:
    determining whether the flexible display touch screen has the first area that spans across the flexible display touch screen in a first direction, in which an amount of change in the inductive capacitances of touch electrodes corresponding to a central line parallel to the first direction in the first area is at its greatest, and the farther a position is from the central line of the first area, the smaller the amount of change is in the inductive capacitances corresponding to this position.

4. The method of claim 2, wherein in response to determining that the flexible display screen does not have the first area, the method further comprises executing the flat work mode in a flat state of the flexible display touch screen and driving the touch electrodes to detect touch operations.

5. The method of claim 2, wherein in response to determining that the flexible display touch screen has the first area, analyzing changes of inductive capacitances corresponding to the plurality of signals further comprises analyzing the amount of change in the inductive capacitances of the touch electrodes corresponding to the position of the central line.

6. The method of claim 5, wherein, in response to determining that the flexible display touch screen has the first area and the flexible display touch screen has entered a dynamically-bending state, the method further comprises executing the dynamically-bending work mode in accordance with the amount of change in the inductive capacitances of the touch electrodes corresponding to the position of the central line.

7. The method of claim 6, wherein the method further comprises:
    calculating the bending parameter of the flexible display touch screen based upon the plurality of signals of the touch electrodes corresponding to the first area and detecting touch operations through the plurality of signals of the touch electrodes in other areas of the flexible touch display screen.

8. The method of claim 5, wherein, in response to determining that the flexible display touch screen has the first area and the flexible touch screen has entered a statically-bending state, the method further comprises executing the statically-bending work mode.

9. The method of claim 8, wherein the method further comprises detecting touch operations through all the touch electrodes of the flexible display touch screen.

10. The method of claim 8, wherein a touch detection threshold of the touch electrodes corresponding to the first area is different from that of the touch electrodes in other areas of the flexible display touch screen.

11. An electronic device comprising:
    a flexible display touch screen, the flexible display touch screen comprising a layer of touch electrodes and a touch detection circuit coupled with the touch electrodes, the touch detection circuit detecting signals from the touch electrodes;

a driving chip coupled with the touch detection circuit configured to control the electronic device in response to the signals from the touch electrodes detected by the touch detection circuit; and a processor configured to calculate a bending parameter of the flexible display touch screen in response to the touch detection circuit detecting signals from the touch electrodes, wherein the bending parameter is associated with a bending state selected from a flat work mode, a statically-bending work mode, and a dynamically-bending work mode wherein changes in the amount of bending in a first area of the flexible display touch screen within a set period of time exceed a set threshold, wherein in response to the processor determining that the flexible display touch screen is in the dynamically-bending working mode based on changes in the amount of bending of the first area of the flexible display touch screen within the set period of time satisfying the set threshold, the touch electrodes in the first area are used for obtaining the bending parameter, and the touch electrodes in one or more non-first areas are used for recognizing touch operations.

12. The electronic device of claim 11, wherein the processor calculates the bending parameter of the flexible display touch screen by analyzing changes of inductive capacitances corresponding to the plurality of signals.

13. The electronic device of claim 12, wherein analyzing changes of inductive capacitances corresponding to the plurality of signals comprises:

determining whether the flexible display touch screen has the first area that spans across the flexible display touch screen in a first direction, in which an amount of change in the inductive capacitances of touch electrodes corresponding to a central line parallel to the first direction in the first area is at its greatest, and the farther a position is from the central line of the first area, the smaller the amount of change is in the inductive capacitances corresponding to this position.

14. The electronic device of claim 13, wherein in response to determining that the flexible display screen does not have the first area, the processor executes the flat work mode in a flat state of the flexible display touch screen and the driver chip drives the touch electrodes to detect touch operations.

15. The electronic device of claim 13, wherein after determining that the flexible display touch screen has the first area, the processor analyzes the amount of change in the inductive capacitances of the touch electrodes corresponding to the position of the central line.

16. The electronic device of claim 15, wherein in response to determining that the flexible display touch screen has entered a dynamically-bending state, the processor executes the dynamically-bending work mode in accordance with the amount of change in the inductive capacitances of the touch electrodes corresponding to the position of the central line.

17. The electronic device of claim 16, wherein in response to the processor determining that the flexible display touch screen is not in the dynamically bending mode, the processor calculates the bending parameter of the flexible display touch screen based upon the plurality of signals of the touch electrodes corresponding to the first area and detects the touch operations through the plurality of signals of the touch electrodes in both the first area and the non-first areas of the flexible touch display screen.

18. The electronic device of claim 15, wherein in response to determining that the flexible display touch screen has entered a statically-bending state, the processor executes the statically-bending work mode.

19. The electronic device of claim 18, wherein the processor detects touch operations through all the touch electrodes of the flexible display touch screen, and a touch detection threshold of the touch electrodes corresponding to the first area is different from that of the touch electrodes in other areas of the flexible display touch screen.

20. A non-transitory computer program product comprising a computer readable storage medium that stores code executable by a processor, the executable code comprising code to perform:

receiving a plurality of signals from touch electrodes of a flexible display touch screen for an electronic device;

calculating a bending parameter of the flexible display touch screen based upon the plurality of signals, wherein the bending parameter is associated with a bending state selected from a flat work mode, a statically-bending work mode, and a dynamically-bending work mode wherein changes in the amount of bending in a first area of the flexible display touch screen within a set period of time exceed a set threshold;

determining whether the flexible display touch screen has the first area based on changes in inductive capacitances corresponding to the touch electrodes; and controlling an operation of the electronic device in response to receiving the plurality of signals, wherein, in response to determining that the flexible display touch screen is in the dynamically-bending working mode based on changes in the amount of bending of the first area of the flexible display touch screen within the set period of time satisfying the set threshold, the touch electrodes in the first area are used for obtaining the bending parameter, and the touch electrodes in one or more non-first areas are used for recognizing touch operations.

* * * * *